US012769014B2

(12) United States Patent
Krefft et al.

(10) Patent No.: US 12,769,014 B2
(45) Date of Patent: Oct. 20, 2026

(54) HIGHLY SCALABLE, LOW LATENCY, GPU BASED GNSS SIMULATION

(71) Applicant: Spirent Communications Plc, Paignton (GB)

(72) Inventors: Felix Michael Krefft, Paignton (GB); Andrew Charles Baker, Bridgwater (GB); Rafal Waclaw Zbikowski, Paignton (GB); Mark Geoffrey Holbrow, Paignton (GB)

(73) Assignee: SPIRENT COMMUNICATIONS, PLC, Crawley (GB)

( * ) Notice: Subject to any disclaimer, the term of this patent is extended or adjusted under 35 U.S.C. 154(b) by 240 days.

(21) Appl. No.: 18/798,701

(22) Filed: Aug. 8, 2024

(65) Prior Publication Data

US 2024/0402353 A1 Dec. 5, 2024

Related U.S. Application Data

(63) Continuation of application No. 18/088,426, filed on Dec. 23, 2022, now Pat. No. 12,066,552, which is a
(Continued)

(51) Int. Cl.
*G01S 19/23* (2010.01)
*G01S 19/37* (2010.01)

(52) U.S. Cl.
CPC .............. *G01S 19/23* (2013.01); *G01S 19/37* (2013.01)

(58) Field of Classification Search
CPC ................................ G01S 19/23; G01S 19/37
(Continued)

(56) References Cited

U.S. PATENT DOCUMENTS 8,384,593 B2 2/2013 Levola et al.
8,934,384 B2 1/2015 Gunawardena et al.
(Continued)

FOREIGN PATENT DOCUMENTS

CN 106291501 A * 1/2017 .............. G01S 7/41
CN 109613569 A 4/2019
(Continued)

OTHER PUBLICATIONS

Ilg, Mark, Framework for a Software-defined Global Positioning System (GPS) Receiver for Precision Munitions Applications, Army Research Laboratory, dated Apr. 2012, 34 pages.
(Continued)

*Primary Examiner* — Harry K Liu

(57) ABSTRACT

The disclosed technology for preparing digital samples for synthesis of RF to simulate channels and GNSS satellites using GPUs includes receiving simulated position and velocity of an antenna, dividing the cycle into points to be converted into the synthesized signal, and computing the points. A first LUT includes pseudo random sequences combinable to produce a code that varies over time for encoding the channel, and a second LUT specifies linear combinations of the pseudo random sequences in the first LUT that produce channel codes to produce the digital sample points. Also included is using GPUs to generate the channel code for a point by mapping the channel code and time position, combining the code with data to be encoded, repeatedly applying the using and combining to produce points, using multiple GPU cores to encode sample points concurrently in the cycle, and sending an ordered sequence of points to a converter.

21 Claims, 8 Drawing Sheets

Signal Illustration

Signal Illustration

Related U.S. Application Data continuation of application No. 17/024,533, filed on Sep. 17, 2020, now Pat. No. 11,536,851.

(60) Provisional application No. 63/073,381, filed on Sep. 1, 2020.

(58) Field of Classification Search
USPC .................................................... 342/357.62
See application file for complete search history.

(56) References Cited

U.S. PATENT DOCUMENTS

| | | | | |
|---|---|---|---|---|
| 10,475,482 | B1 * | 11/2019 | Nangare | G11B 20/10388 |
| 10,574,437 | B1 | 2/2020 | Ye et al. | |
| 2020/0371250 | A1 | 11/2020 | Filarsky et al. | |
| 2022/0095114 | A1 | 3/2022 | Bishop et al. | |

FOREIGN PATENT DOCUMENTS

| | | | | |
|---|---|---|---|---|
| CN | 111413699 A * | 7/2020 | | G01S 7/52001 |
| CN | 110515050 B | 8/2021 | | |
| WO | 2021041447 A1 | 3/2021 | | |
| WO | 2021045976 A1 | 3/2021 | | |

OTHER PUBLICATIONS

Bartunkova et al., Broadband Multi-Frequency GNSS Signal Simulation with GPU, IEEE, dated 2016, 14 pages.
Spirent, Spirent GSS7000, Flexible and Powerful Multi-GNSS Constellation Simulator System, dated 2020, 4 pages.
Spirent, How Should the Automotive Industry Test V2X Systems, White Paper, dated 2018, 12 pages.
Anonymous, An Introduction to GNSS—Chapter 6—GNSS + INSS, NovAtel, retrieved on Sep. 24, 2018, 3 pages. Retrieved from the internet [URL: https://www.novatel.com/an-introduction-to-gnss/chapter-6-gnss-ins/gnss-ins-systems/ ].
Spirent, Spirent GSS6700, Flexible Multi-GNSS Constellation Simulator System, dated 2015, 4 pages.
Bartunková, Parallel Software Architecture and Algorithms for GNSS Signal Simulation (dissertation), Jun. 10, 2016, Universität der Bundeswehr München, 138 pgs (https://athene-forschung.unibw.de/doc/121215/121215 .pdf).
Generation of GNSS Signals in a Hardware in the Loop (HIL) Environment, Application Note, Version 1GP102_3E, Rohde & Schwarz GmbH & Co. KG, 2020, 40 pages (http://www.rohde-schwarz.com/appnote/1GP102).
Wang, et al "Acceleration Method for Software Signal Simulators of BDS Navigation Signals and RDSS Signals Based on GPGPU," IEEE Access, vol. 7, Jun. 2019, pp. 102843-102851.
Wei et al, Chap 25, "General Computing Platform Based GNSS Signal Simulator Architecture: Design, Implementation and Validation", China Satellite Navigation Conference (CSNC) Apr. 2014 Proceedings: vol. I (Lecture Notes in Electrical Engineering 303), (J. Sun et al. (eds.)), pp. 279-294 (DOI: 10.1007/978-3-642-54737-9_25, Springer-Verlag Berlin Heidelberg 2014).
Li et al., Chap 35, "A CUDA-Based Real-Time Software GNSS If Signal Simulator", China Satellite Navigation Conference (CSNC) 2012 Proceedings, Lecture Notes in Electrical Engineering 161, J. Sun et al. (eds.), pp. 359-369. (DOI: 10.1007/978-3-642-29193-7_35, Springer-Verlag Berlin Heidelberg 2012).
Bartunkova, et al, Massive Parallel Algorithms for Software GNSS Signal Simulation using GPU, 25th International Meeting of the Satellite Division off the Institute of Navigation, Nashville, TN, Sep. 17-23, 2012, pp. 119-126.
GB—2015482.9, Search Report dated May 26, 2021, 3 pages.
GB2015482.9—First Examination Report dated May 1, 2024, 4 pages.
GB2015482.9—Response to First Examination Report dated May 1, 2024, filed Jul. 1, 2024; 9 pages.
GB2015482.9—Notice of Intention to Grant dated Aug. 5, 2024, 2 pages.

* cited by examiner

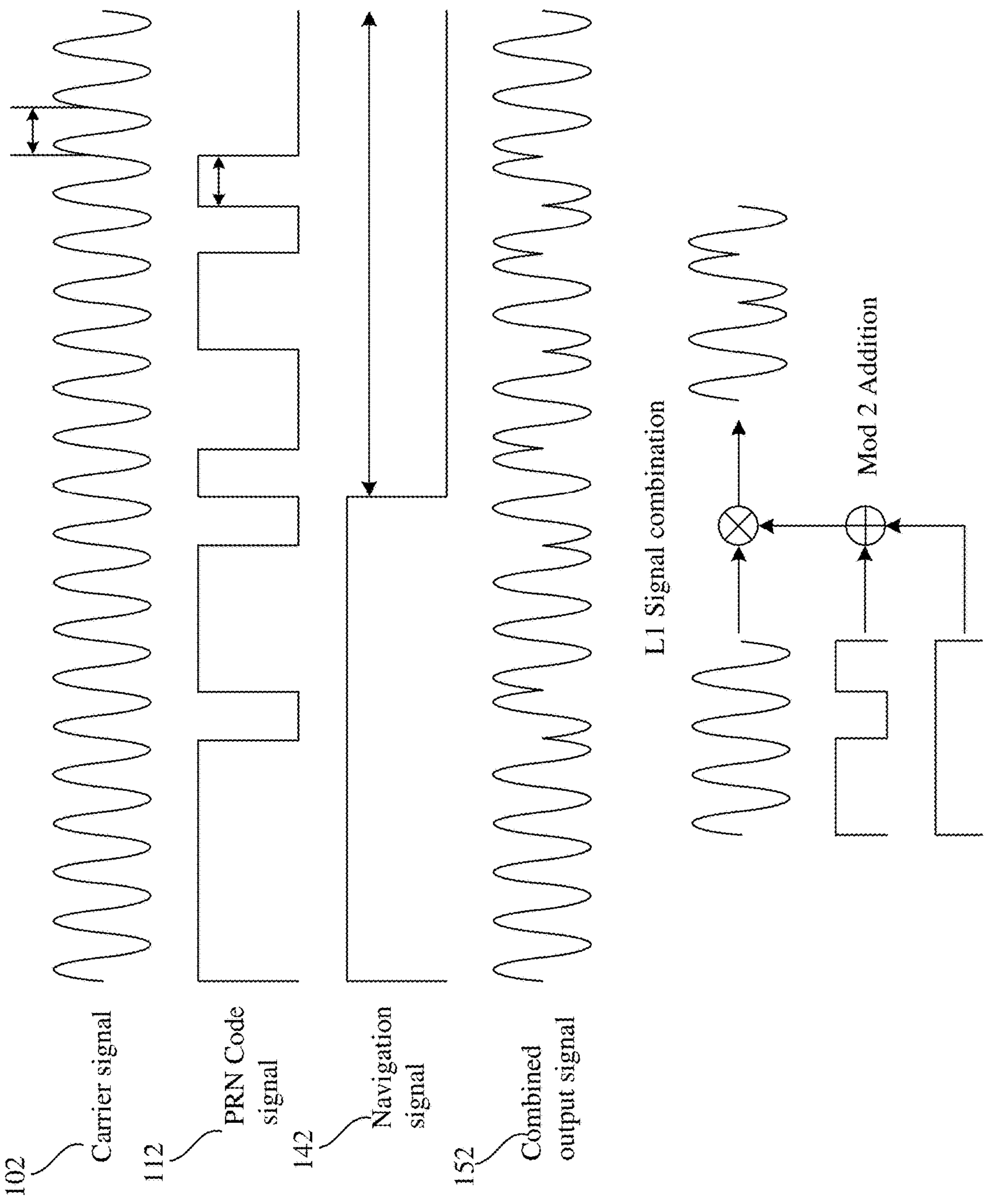
FIG. 1A – Signal Illustration

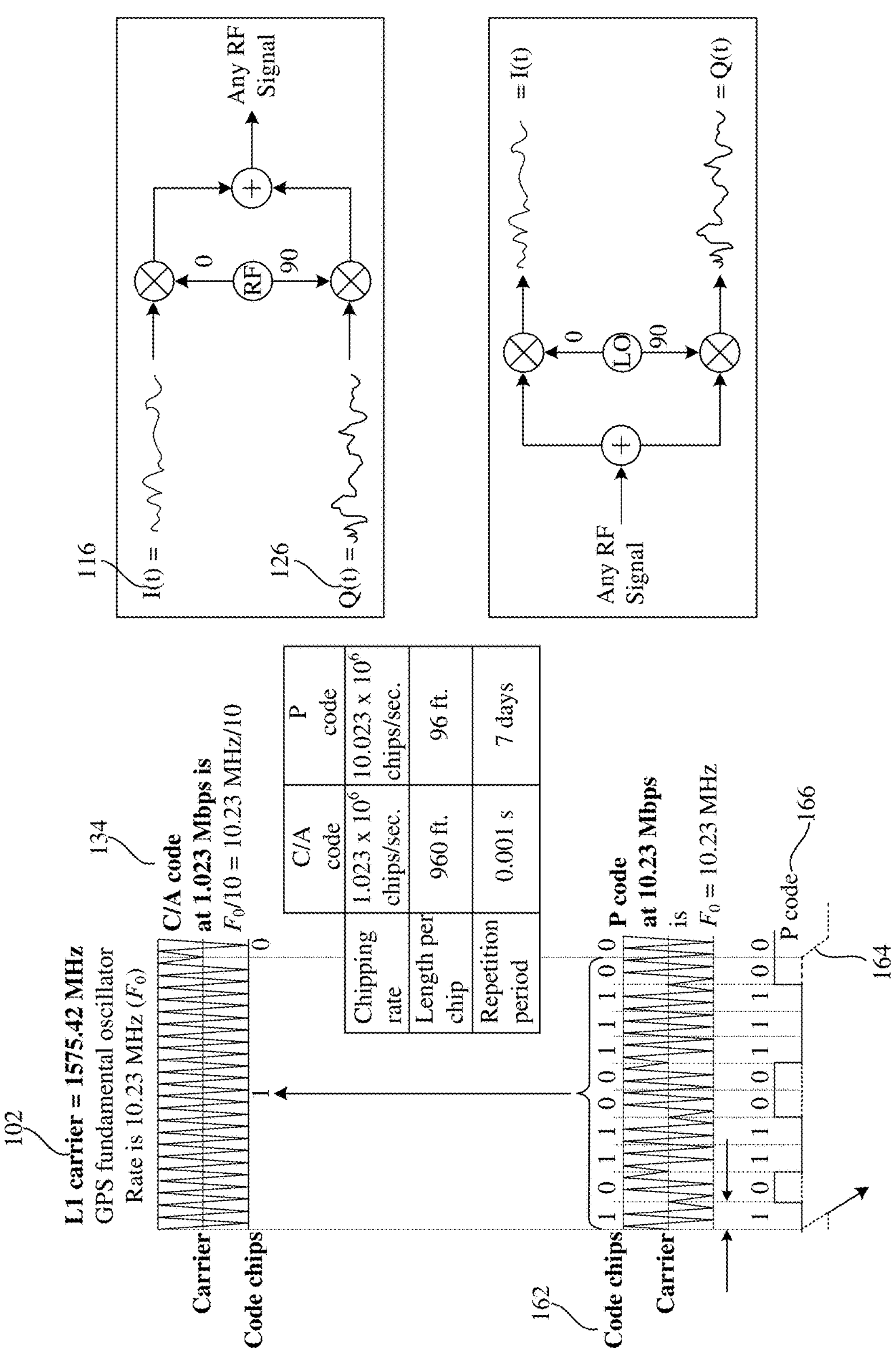
| | C/A code | P code |
|---|---|---|
| Chipping rate | 1.023 x $10^6$ chips/sec. | 10.023 x $10^6$ chips/sec. |
| Length per chip | 960 ft. | 96 ft. |
| Repetition period | 0.001 s | 7 days |
FIG. 1B - Signal Illustration

HIGHLY SCALABLE, LOW LATENCY, GPU BASED GNSS SIMULATION

CROSS-REFERENCE TO RELATED APPLICATIONS

This application is a continuation of U.S. application Ser. No. 18/088,426 titled "Highly Scalable, Low Latency, GPU Based GNSS Simulation," filed 23 Dec. 2022, now U.S. Pat. No. 12,066,552, issued 20 Aug. 2024 which is a continuation of U.S. application Ser. No. 17/024,533, filed 17 Sep. 2020, now U.S. Pat. No. 11,536,851, issued 27 Dec. 2022 which claims priority to and the benefit of U.S. Provisional Application No. 63/073,381, filed 1 Sep. 2020. The priority application is incorporated by reference herein for all purposes.

FIELD OF THE TECHNOLOGY DISCLOSED

The technology disclosed relates generally to Global Navigation Satellite Systems (GNSS) and more specifically to harnessing GPUs to synthesize GNSS encoded signals, instead of using FPGAs.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Global navigation satellite system (GNSS) is used in this discussion to refer collectively to global and regional satellite systems that broadcast signals used to fix locations, both on the surface of the Earth and in the atmosphere. The familiar US GPS satellite system uses one set of signals/codes, some available for general use and others for restricted, government or military use. Russia has GLONAS. Europe and China also have satellite constellations that are or soon will be global. Regional satellites over Japan and India, for instance, also are available. There is enough similarity among this range of GNSS systems that a single test apparatus can simulate signals from which ever satellites a receiver can process. The more sophisticated the receiver, the more constellations it handles and the more elaborate the test apparatus must be, both because more signal sources (satellites) are visible at one time and because multiple encoding systems are used by the various constellations.

Encoding and decoding positioning signals from GNSS satellites is a precise, demanding task, especially when coupled to a vehicle motion simulator. Both relativistic and Doppler effects of satellite motion need to be taken into account in order for our location-enabled devices to triangulate terrestrial positions within three or six feet accuracy, based on signals originating tens of thousands of miles away. A vehicle motion simulator delivers current vehicle trajectory as the simulation proceeds, which reduces pre-calculation options.

Some of the GNSS signals have a bandwidth of more than 90 MHz and require sample rates of up to 120 Msps in the signal generation. This complex encoding is handled on satellites by special purpose application-specific integrated circuits (ASICs). In simulators, signals are digitally synthesized by deep pipelines on field programmable gate arrays (FPGAs). However, FPGAs are expensive and relatively difficult to program.

One use of test apparatus that simulates GNSS signals is pairing with a flight or autonomous drive simulator (closed loop system) that updates the path and velocity of a vehicle in response to the GNSS signals that its receiver decodes. For instance, a pilot exercises a flight simulator allows under simulated instrument flight conditions. As the pilot controls the flight, the GNSS simulator updates the signals being generated to take into account the vessel's position and velocity. The same updating takes place when the GNSS simulator interacts with an algorithm that pilots an autonomous vehicle, whether a drone, truck or car. The test apparatus may be called on to simulate GNSS signals responsive to an unpredicted and constantly updated course of a vessel.

An opportunity arises to harness GPUs for GNSS encoded signal synthesis. The use of GPUs instead of FPGAs will result in more flexibility in the signal generation, and other types of signals can be generated, and used with software receivers, and in the cloud.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches preparing digital samples for synthesis of an RF signal encoded to simulate a channel, multiple channels of a GNSS satellite, or multiple GNSS satellites, using a GPU instead of an FPGA. This includes receiving a simulated position and velocity of a receiver antenna, for a simulation cycle, to which a synthesized RF signal is to be provided, dividing the cycle into digital sample points that will be converted into the synthesized RF signal, and computing the digital sample points for the channel using a multiplicity of cores of a GPU. The technology disclosed can further provide a first LUT that includes pseudo random sequences that can be combined to produce a channel code that varies over time and is used for encoding the channel, and can provide a second LUT that specifies linear combinations of the pseudo random sequences in the first LUT that produce channel codes to produce the digital sample points in the cycle, using at least one core of the GPU to generate the channel code for a respective sample point by mapping the channel code required to an entry in the second LUT that specifies the pseudo random sequences from the first LUT to combine to produce the channel code, and mapping a time position of the respective sample point to one or more entries in the first LUT that are specified in the second LUT. Further disclosed is combining the channel code for the respective sample point with data to be encoded by the respective sample point, and repeatedly applying the using and the combining to produce the digital sample points in the cycle, using a multiplicity of cores of the GPU to encode respective sample points concurrently in the cycle, and sending an ordered sequence of the digital sample points for the cycle to a converter that is configured to synthesize the RF signal that simulates the channel, multiple channels of the GNSS satellite, or multiple GNSS satellites from the digital sample points.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 1A illustrates background information for GPS L1 C/A signal structure, with a carrier signal, a PRN code signal and Navigation data stream, and shows a combined, spread spectrum output signal containing carrier, PRN and navigation signal.

FIG. 1B illustrates the relationship between the L1 carrier and the code chips on the left and the relation between baseband IQ data and the RF signal on the right.

FIG. 4A shows an example code NCO waveform.

FIG. 4B shows code generator waveforms.

FIG. 4C illustrates an example code selection waveform.

FIG. 4D shows a waveform after the signal has passed through the pulse shaping filters.

FIG. 4E illustrates the waveform after channel baseband processing.

FIG. 4F illustrates the complex mix of code and carrier signals.

DETAILED DESCRIPTION

Figure 2:
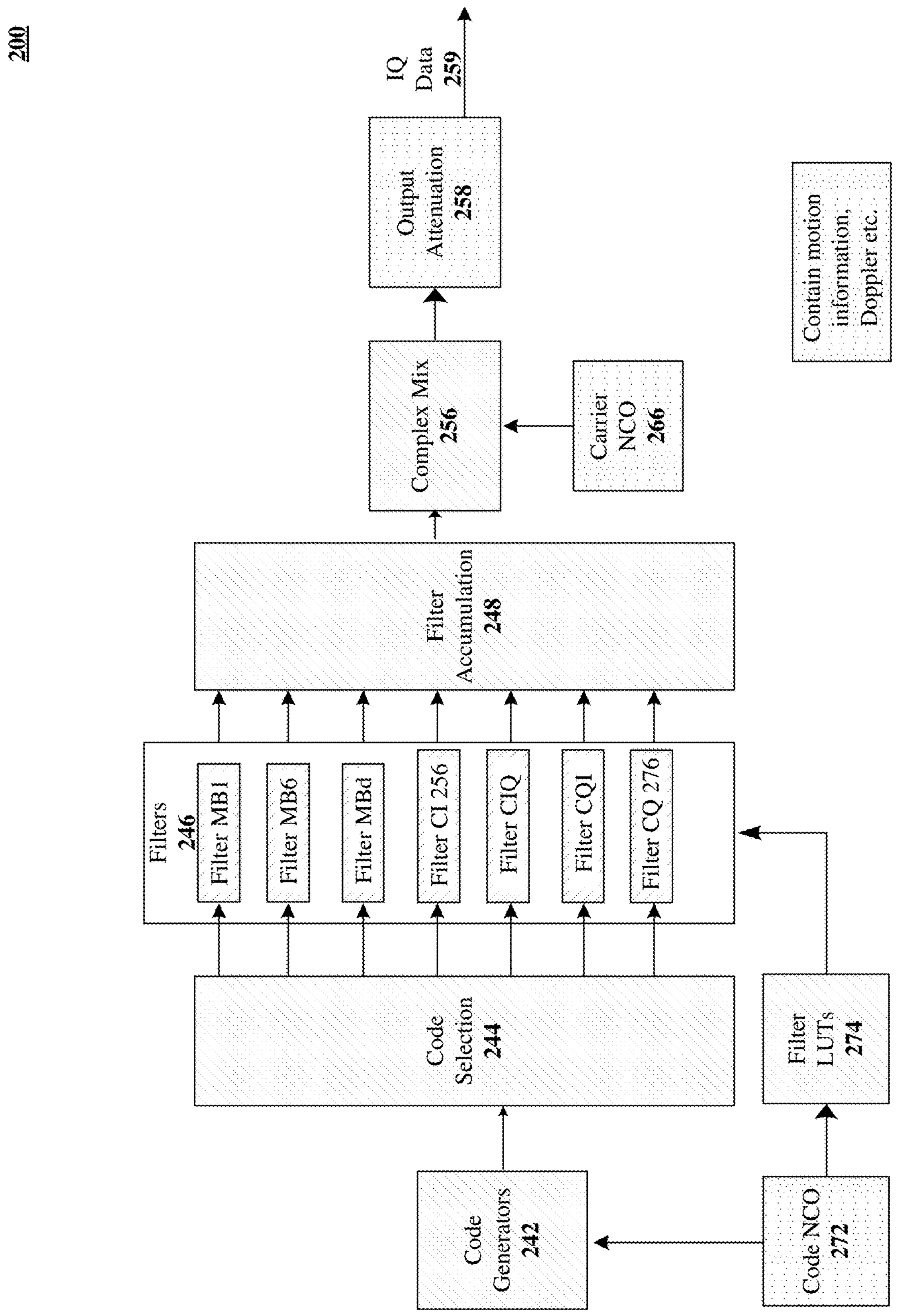
FIG. 2 depicts an exemplary system for producing digital samples for generating encoded GNSS signals simulating a GNSS channel, multiple channels, and multiple GNSS satellites, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

GNSS simulators are test tools that are able to create Radio Frequency (RF) signals that are practically indistinguishable from the signals that would be received from an actual constellation of moving earth-orbiting navigation satellites at a given location, date and time. Simulators create the effects of a time-delayed signal representing the transit time of the signal transmission from a satellite thousands of kilometers away from the receiver with appropriate signal level. The simulator can superimpose many real-world effects such as dispersion of the signal due to the electrically-charged Ionosphere leading to signal timing delay and the effects of reception antenna gain and phase variation as a function of arrival angle at the antenna. Other effects can include effects of multi-paths, ionospheric delay, tropospheric delay, terrain obscuration, antenna patterns (gain and phase), and results of interference simulation.

On state-of-the-art GNSS simulators virtually all of these real-world degradations are under the control of the user via a software control interface to a series of mathematical models. On such simulators the time alignment between individual signal components within and between constellation types is necessary to ensure that simulated signals are as representative of those from actual satellites as possible.

Generating encoded GNSS signals emulating multiple satellites is a compute intensive task, as numerous calculations are required to generate each sample in 120 Msps synthesis. The state machines that are used on FPGAs in deep pipelines to generate and encode signals could not reasonably be threaded through the cores of a GPU. Deep pipelines are not readily accommodated by GPU architecture. A new architecture is required.

The technology disclosed abandons stateful deep pipelines in favor of stateless parallel computations they can be scheduled across numerous GPU cores. Code generators, which an FPGA uses to statefully produce long pseudo random progressions, are replaced by stateless look up tables (LUTs) that are too large for FPGA look up tables (LUTs) to accommodate and other operations. For example, Binary Offset Carrier (BOC) signals are generated by a modulo operation from the NCO, NAV is very slow (a few bits per millisecond) and supplied in a small buffer, P-Code uses multiple small LUTs to generate a very long sequence. The FPGA's synchronous pipeline for feeding samples into a digital-to-analog converter is replaced by parallel computation of samples within a batch, such as a milli-second batch of samples, which are presented to the digital-to-analog converter in order. Batch size can also be smaller or bigger than a millisecond. Smaller batches allow lower latency and more accurate representation of vehicle dynamics. Bigger batches are more efficient performance-wise. Stateless batch jobs can be scaled to the available GPU resources without reconfiguring a FPGA. Accommodating more satellite channels, either for more satellites, for environmental effects, or for malicious interference is as simple as adding more GPU resources.

Figure 3:
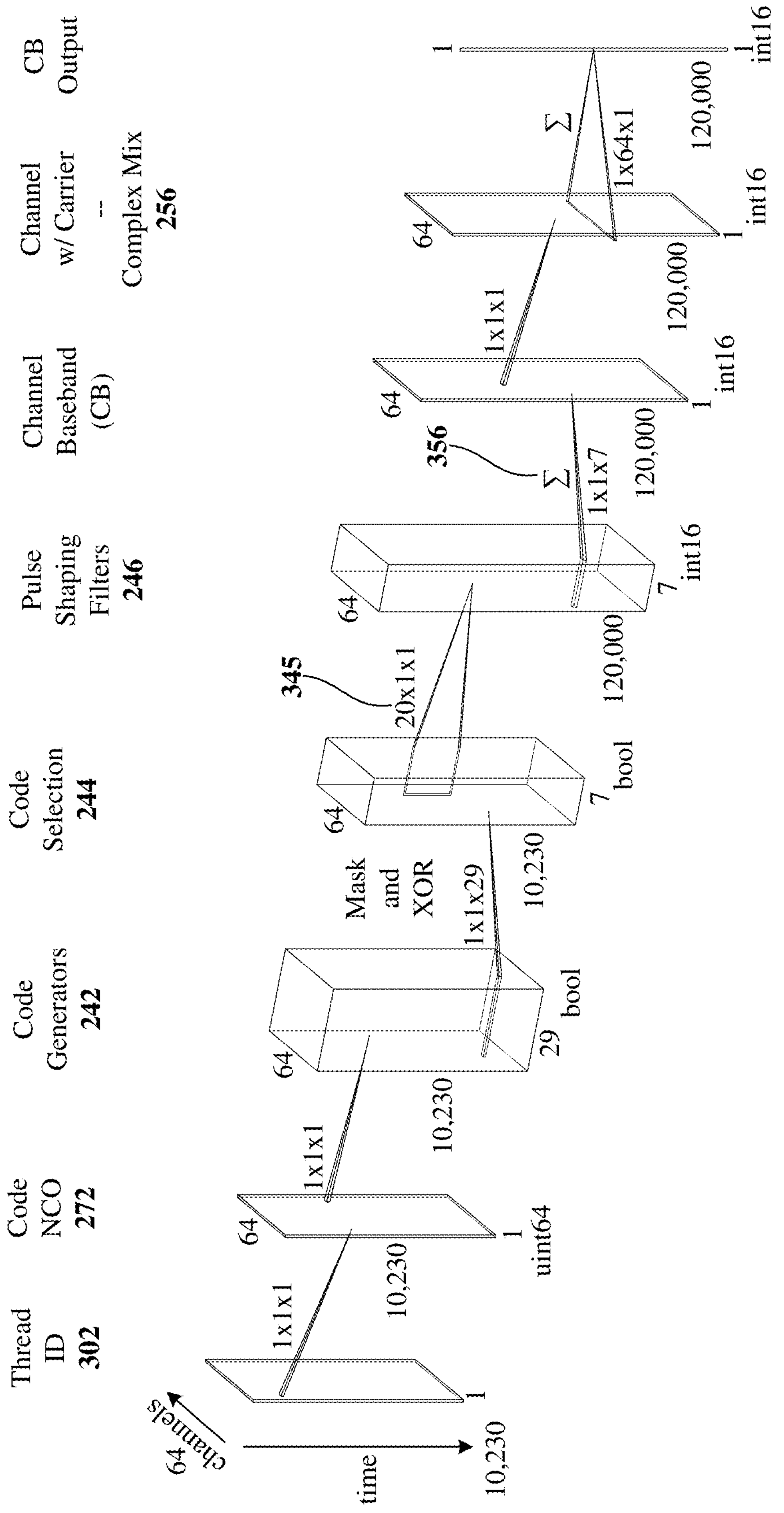
FIG. 3 illustrates blocks for producing digital samples for generating encoded GNSS signals emulating multiple satellites, using a general processing unit (GPU), instead of a field programmable gate array (FPGA).

As the position and velocity of a vessel is updated, for instance each millisecond, the GPU calculates the next batch of digital samples. Within such a batch, the samples can be calculated independently as the motion in the corresponding small timeframe is assumed to be linear and the state can be predicted independently for each sample. A batch is calculated in several stages as illustrated in FIG. 3; in the first stages the filter inputs (combined PRN/NAV sequences) are calculated. There are up to 10,230 samples per millisecond, dependent on the maximum code rate. GPS L1 C/A code, for example, requires 1023 samples per millisecond whereas GPS L1 P code requires 10,230 samples per millisecond. These numbers are generally slightly higher or lower, as the code rate seen by the receiver varies because of the Doppler effect caused by the relative motion between satellite and vehicle. The following stages (pulse shaping filters, combination of filter outputs, complex mix with carrier and the channel accumulation) use higher number of samples per millisecond (currently up to 120000) dependent on the required sample rate of the output IQ data.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| ADAS | Advanced Driver-Assistance System |
| Alt-BOC | Alternate Binary Offset Carrier GNSS signal |
| ASIC | Application-Specific Integrated Circuit |
| BOC | Binary Offset Carrier |
| BPSK | Binary Phase Shift Keying |
| CASM | Coherent Adaptive Sub-Carrier Modulation |
| FPGA | Field Programmable Gate Array |
| GLONASS | Global Navigation Satellite System |
| GNSS | Global Navigation Satellite System |
| GPS | Global Positioning System |
| LUT | Look Up Table |
| Mellanox IB | InfiniBand (IB) is a computer networking communications standard used in high-performance computing that features very high throughput and very low latency. . . . Mellanox IB cards are available for Solaris, FreeBSD, RHEL, SLES, Windows, HP-UX, VMware ESX, and AIX. |
| MBOC | Multiplexed Binary Offset Carrier |
| PRN | Pseudo Random Number |
| SIMHil | hardware-in-the-loop (HIL) testing software API for Spirent GNSS simulators |
| SIR | Simulation Iteration Rate |
| SVN | Space Vehicle Number |
| TMBOC | Time-Multiplexed Binary Offset Carrier |

GPS Signals

Satellites are uniquely identified by a serial number called space vehicle number (SVN) which does not change during its lifetime. In addition, the operating satellites are numbered with a space vehicle identifier (SV ID) and pseudorandom noise number (PRN number) which uniquely identifies the ranging codes that a satellite uses. One satellite transmits multiple, different PRN sequences for different signals it is transmitting. For example, a GPS SV transmits on L1 the C/A, P and other codes which have different PRN sequences. Additional codes are transmitted on other frequencies (L2, L5) by the same GPS SV.

GPS operates in the IEEE "L" radio band. The GPS L1 signal is a spread spectrum signal, meaning that the signal has a center frequency of 1575.42 MHz, but the signal power is intentionally spread over a wide frequency range. The spectrum of frequencies that contain power from the GPS L1 signal is wider than 50 MHz, but a commercial L1 GPS receiver will limit received RF bandwidth to between 2 MHz and 10 MHz. GNSS signal generation is inherently parallel, with multiple satellite signal channels generated simultaneously for each of several signal services of each of several GNSS systems. For the ranging codes and navigation message to travel from the satellite to the receiver, they are modulated onto a carrier wave.

FIG. 1A illustrates background information for GPS L1 C/A signal structure, with a carrier signal 102 at 1575.42 MHz, a PRN code signal 112 with 1.023 M chips/second, Navigation data at 50 bps and shows a combined, spread spectrum output signal 152 containing carrier, PRN and navigation signal 142. For the combined output signal 152, each shift from +1 to −1, or from −1 to +1 causes a corresponding phase shift of 180 degrees in the carrier. First the Mod 2 sum (same as XOR) of the PRN and NAV data (both binary) is built and the output is combined with the carrier. The carrier is a complex sinusoid and the combined PRN/NAV is also complex, with I and Q components. The C/A code (with NAV) is purely the Q component. If only the C/A code is generated there is nothing on the I component. The P code (with NAV) would go to the I component. Other signals go on both components. Code and carrier are combined by a complex mix.

L1 GPS signal power is spread over a range of frequencies by modulating the carrier using binary phase shift keying (BPSK) modulation with a pseudo random number (PRN) sequence, combined with the navigation data the satellite intends to transmit. A PRN is a sequence of binary values that has statistical properties similar to a random number. A GPS L1 C/A PRN is a repeating sequence of 1023 data bits, called "chips". P code sequence is much longer 6,187,104, 000,000 p-chips, repeating once per week.

GPS satellites are in orbits around the Earth. Because the satellites and possibly the receiver are moving, the relative motion between the satellite and the receiver changes the L1 carrier and PRN modulation frequencies by up to multiple kHz, due to the Doppler effect. The receiver must be capable of searching for and tracking the carrier and PRN over this frequency range.

The signal transmitted by a GPS SV on the L1 band consists of multiple components (ranging codes and navigation messages), each of which has a unique function: the freely available C/A (coarse acquisition), the encrypted P(Y) code(precise), the modernized military M-code and new L1C signal (civil, for interoperability with Galileo and other GNSS systems. The C/A code is transmitted on the L1 frequency as a 1.023 MHz signal using a bi-phase shift keying (BPSK) modulation technique. The P(Y)-code is transmitted on both the L1 and L2 frequencies as a 10.23 MHz signal using the same BPSK modulation, however the P(Y)-code is in quadrature with the C/A code (meaning it is 90° out of phase). L1C uses Time-Multiplexed Binary Offset Carrier (TMBOC) modulation, also implemented in the GPU implementation.

The GPU architecture described herein can be used for generating GPS L1, L2 and L5 as well as any other existing GNSS constellations on all frequency bands. It can also be extended to simulate signals from other satellite constellations, such as IRIDIUM and NEXT (ADS-B).

FIG. 1B illustrates the relationship between the L1 carrier 102 and the code chips 162. The PRN signal is modulated on the carrier signal 102. The first pseudo-random code is called the C/A (Coarse Acquisition) code 134, a bi-phase modulated signal with a chip rate of 1.023 MHz, which modulates the L1 carrier 102. It repeats every 1023 bits and modulates at a 1 MHz rate. Each chip is about 977.5 ns (1/1.023 MHZ) long. The C/A code is the basis for civilian GPS use.

The second pseudo-random code is called the P (Precise) code 166. It is a particular series of ones and zeroes generated at a rate of 10.23 million bits per second. It is carried on both L1 and L2 and it is very long. The P-code is a PRN sequence much longer than the C/A code, at $6.187104\times10^{12}$ chips (773,388 MByte). Even though the P-code chip rate (10.23 Mchips/s) is ten times that of the C/A code, it repeats only once per week, eliminating range ambiguity. The week-long P code transmitted by each satellite is a particular week of the 37-week-long 'master' P code and helps a GPS receiver distinguish one satellite's transmission from another.

FIG. 1B also depicts how the IQ data, that is generated by the technology disclosed, consisting of the in-phase component I(t) 116 and the quadrature component Q(t) 126 can be used to generate an RF signal via an RF upconverter. I(t) data is in-phase and Q(t) data is quadrature-phase data (90 degrees out of phase with I(t) data). The bottom right part of FIG. 1B shows how a received RF signal can be converted to an IQ stream via a local oscillator.

FIG. 2 illustrates architecture 200 for producing digital samples for generating encoded GNSS signals simulating a single GNSS channel. To simulate multiple channels, and multiple GNSS satellites, each GNSS channel is calculated separately (in parallel as the calculation of different GNSS channels/satellites is independent from each other) by architecture shown in FIG. 2. In a final step not illustrated in FIG. 2, the IQ output 259 of all channels on the same center frequency (for example all L1 channels) are summed up resulting in one IQ stream per center frequency, that can be transferred to corresponding RF upconverters to generate an RF signal or can be stored into a file. The architecture for a single GNSS channel 200 includes code generators 242, code selection 244, code numerical controlled oscillator (NCO) 272, filters 246, filter accumulation 248, complex mix 256, output attenuation 258 and carrier numerical controlled oscillator (NCO) 266. The generation of the IQ data 259 is done in several steps consecutively. The first step is to update parameters changing during the run of the simulation, that are the phase increments of the Code NCO 272 and Carrier NCO 266 as well as the Output Attenuation 258. The phase increments are changing for example due to changes in the relative motion between satellite and antenna under test or atmospheric effects. The output attenuation is changing due to changes in the received signal power level resulting for example from a change of the attitude of the antenna or signal obscurations. The NCO and output attenuation updates are supplied by other software components of the simulation. Code NCO 272 is a numerically-controlled oscillators (NCO), digital signal generators for creating a discrete-time, discrete-valued sinewave serving as a clock for the code generators 242. The code NCO 272 is running typically at 10.23 MHz but can also be run at other frequencies depending on the required code rates and is corrected by Doppler and other effects. When the Code NCO is running at 10.23 MHz and P-code (which is running at 10.23 million chips per second) should be generated the P-code is advanced by one chip on every overflow of the Code NCO 272. If there is a positive Doppler effect because of the relative motion between satellite and antenna a slightly increased phase increment is provided for the Code NCO and it is running i.e. overflowing a bit faster and as the P-code is still advancing on every overflow also the advancing slightly faster. If, in addition to the P-code CA-code also needs to be generated the Code NCO 272 still needs to run at 10.23 MHz to provide the proper clock for the P-Code, but the CA-code needs to run at 1.023 million chips per second. To achieve that in this case the CA code generator is just advancing on every tenth overflow of the Code NCO. Code generators 242 are a set of different ranging code and navigation data generators like the CA-code generator and P-code generator. There are many more code generators than just the CA and P code generator in order to be able to generate the ranging codes and navigation data for every existing GNNS constellation. The way code generators 242 operate is based on algorithms in one example, and lookup tables (LUTs) in another case. LUTs are used for short sequences like the CA-code (1023 chips), but are not practical for long sequences as the P-code (6.187104×1012 chips) in which case algorithms are used. In some cases, the combination of multiple LUTs is also used, for example when there are primary and secondary codes. Code selection 244 combines the outputs from the code generators to the input streams of the pulse shaping filters 246, a many-to-many mapping, and is dependent on the simulated signal. In the GPS L1 case there are up to seven filters used, one for each input of the two modulators (4 CASM inputs and 3 TMBOC inputs). For example, the CA-code and the legacy navigation data are both going to the Q arm of the CASM modulator. Therefore, the code selection block is XORing the CA code and legacy NAV message and putting the result to the input of Filter CQ 276. The legacy navigation message is also forwarded to the Filter CI 256 input but XORed with the P-code.

Continuing the description of architecture 200, filters 246 generate the spread-spectrum, finite bandwidth signals from the binary input signals for generating realistic simulation of GPS signals generated by satellites. Filter accumulation 248 superimposes outputs from pulse shaping filters 246 according to the different modulations (CASM, MBOC, ALTBOC etc.) to generate a single IQ complex number stream. Complex mix 256 takes in the carrier complex sinusoid generated by the carrier NCO 266 and performs a complex mix with the IQ output from the filter accumulation 248. If a baseband IQ stream is generated the frequency of the carrier NCO is the carrier Doppler frequency (i.e. if there is no Doppler effect present there is no carrier present on the output IQ data 259). This architecture can also be used to generate an intermediate frequency (IF) stream such that a fraction of the carrier frequency plus carrier Doppler is present on the output IQ data 259, for example, to combine multiple GNSS channels with similar but not equal carrier frequency (for example GLONASS FDMA) to one IQ stream that can go to a single file or single RF upconverter. Output attenuation 258 applies a gain to set the power level of the signal as seen by the receiver.

Given the starting position for a receiver—such as one in an autonomous vehicle or drone, the trajectory of the receiver, and the date and time—the simulator can calculate the GNSS signal seen by the receiver antenna where the motion is updated up to once per millisecond, so 1000 times per second. In this simulation, a very accurate mathematical model of the motion of GPS satellites and the signals they send, including the effects of the earth's atmosphere are used to update the parameters of the disclosed signal generation process. In some cases, especially when the simulator is part of a closed loop simulation. The simulator does not know the trajectory in advance; the points of the trajectory are updated as they emerge, and can change every millisecond. In one example of flying a drone, the controller can use the GPS simulator output to correct its trajectory, by controlling the thrusters on the drone. Physical effects affect the position, and the simulator calculates the GPS signals based on position. That is, position and GPS affect each other. Position updates are used to calculate GPS signals, as external inputs provided to the GPS simulator. That is, an emerging position is handled by the GPS simulator.

FIG. 3 illustrates the blocks for producing digital samples for generating encoded GNSS signals emulating multiple satellites, using a general processing unit (GPU), instead of a field programmable gate array (FPGA). FIG. 3 illustrates the process for single center frequency, for example GPS L1/Galileo E1, if multiple center frequency are simulated for example L1 and L5 multiple instances of the illustrated process are running in parallel resulting in multiple IQ output streams (one per center frequency). These multiple IQ output streams can go into separate files or to separate RF upconverters that are tuned to the corresponding center frequencies. The different instances for the different center frequencies can be easily spread across multiple GPUs. We describe the blocks for generating the output for a one millisecond batch, for 64 channels, with 120,000 samples in the time domain which is represented by the arrow pointing toward the bottom of the figure. These dimensions are automatically adjusted according to the simulation requirements, i.e. more or less channels and more less samples in the time domain in the batch. The number of samples in the time domain are affected by the required bandwidth, which is directly linked to the number of samples per second (120 Msps in FIG. 3), and the timespan of a batch (1 ms in FIG. 3). The timespan of a batch can be reduced to allow more motion updates per second (more accurate simulation of motion) and to improve latency. The timespan of a batch can also be increased to make the simulation more efficient performance wise. The computation for a millisecond of data is handled as an individual batch job. Multiple batch jobs, processing different milliseconds of data, run successively.

An input to the simulator is a trajectory of the receiver antenna, with a starting position and time. Other components of the simulator calculate initialization parameters, the NCO phase increments and the output attenuation which are the inputs to the disclosed signal generation process. The process produces output, for a single batch of one millisecond, of 120,000 data samples in the IQ domain, complex numbers representing an IQ stream in the time domain by an IQ vector. Waveforms for steps are described relative to FIG. 4, later in this document.

When spawning a batch job that will run through the process pipeline in parallel with other jobs, each job has a thread ID and X and Y components (x from 0 to 10230, y from 0 to 64). For generating the state of NCO code, the exact frequency 10.23 MHz is dependent on the Doppler effect.

Continuing the description of FIG. 3, a batch of data has thread ID 302. Inputs to code NCO 272 are generated to take into account the relationship between the satellite and the receiver, using the phase increment to represent the Doppler effect. The calculation of the receiver movement is supplied each millisecond as input to code NCO 272. The space increment is considered constant for one millisecond, due to the simulation duration rate of the simulator. After a millisecond, an update takes into account inputs from outside the simulator. The next batch takes into account the update based on external information. The code snippet listed next is an example for determining step counts, using the phase offset and phase increment information for generating the code stream inputs to code generators 242.

```
uint96_t step = phaseOffset_after_last_ms[channelId];
step += tid.x * phaseIncrement[channelId]; // tid = threadID
// top 8 bits of bottom 32 bits select LUT column
int16_t lutColumnIndex = (step & 0xFF800000) >> 23;
uint64_t msbStep = step.shiftRightBy32( ); // Number of NCO overflows
```

In one implementation, 29 code generators support the set of constellations currently in use. In a different example, 30 or 31 code generators could be used to support new constellations. Up to twenty-nine code generators 242 operate for each the 64 example channels. C/A code, P code, Noise, 4× linear feedback shift register, 4× large memory code generator, 2× small memory code generator, 2× barrel shifter, 3× navigation data buffer, 5×BOC generator and a signal to invert the output signal are included in one example implementation. Typically, a few code generators are used. For example, if only GPS L1 C/A with navigation data is generated, only two code generators are required (C/A generator and one NAV buffer). If To generate GPS L1 C/A and L1C with corresponding NAV, C/A generator, 2×NAV buffer, 3× large memory and one BOC would be included in the implementation. The code generators are separate for each channel/satellite. For example, to simulate 8 GPS satellites with only L1 C/A and NAV, each channel would use its CA generator and one of its NAV buffers, and for each satellite the two generators would utilize different initial values to produce their unique PRN. Many but not all (as mentioned above) code generators are implemented as LUTs.

The code snippet listed next illustrates code for generating the C/A code, described earlier in this document.

```
// e.g. for CA code
result[tid.x, channelID, 5] = constantParameers.CA_PRN[channelID,
msbStep / 10 % kPrnSequenceLength];
// divide by 10 as CA code advanced every 10 NCO advances (1.023M
chips per second)
```

Code generators 242 store the state of each of the 64 channels for each of the 10,230 samples in the time domain, taking into account the chip rate for calculating the state of each code generator for each of 10,230 time samples. Mask and XOR of the samples in code generators 242 specifies linear combinations of the pseudo random sequences in the first LUT that produce channel codes to produce the digital sample points in the cycle. The result includes signals for selecting 7 of the 29 code generator elements as inputs for code selection 244.

Filters 246 illustrates an example with seven filters. Depending on the simulated signal, a subset of the seven may be used. Four of the seven filters are for the Coherent Adaptive Sub-Carrier Modulation (CASM) modulator; the other three are for the Multiplexed binary offset carrier (MBOC) modulator. More filters are implemented for additional modulators; for example, another eight for an Alternate Binary Offset Carrier (Alt-BOC) modulator and another two for additional special signals, in other implementations which utilize a subset of the filters at any one time. One filter is utilized for each of the four inputs of the CASM modulator, so the signals that go on the same arm are combined in the code selection step and proceeds by one filter. Two filters are utilized for generating GPS L1 C/A and P code, for example. The C/A code goes onto the Q arm, Filter CQ 276, and the P code goes onto the I arm, Filter CI 256. They are 90 degree out of phase. The I element (in phase) and Q element (quadrature phase), IQ Arm, support different modulator tabs.

To get smooth transitions, the disclosed technology uses many more data points to represent more detailed signals. For a code selection example, input from 10 code samples in a time line, with 20 samples next to each other in history, are used to calculate 120,000 elements per millisecond from 10,230 samples. Each of the 10,230 samples gets converted to 20 elements long (20×1×1) 345. Outputs of code selection 244 map to pulse shaping filters 246 that handle oscillations and discontinuities, smoothing discontinuous jumps that are not representable readily using analog signals composed of sine waves. That is, in a bandwidth around the frequency, discontinuities produce oscillations. The disclosed pulse shaping filters 246 modify the signals for realistic simulation of GPS signals generated by satellites. The code snippet listed next illustrates the use of filter look up tables (LUTs) 274 for selecting pulse shaping filters 246.

```
uint96_t step = phaseOffset_after_last_ms;
step += static_cast<uint64_t>(tid.x) * phaseIncrement; // tid = threadID
const int16_t lutColumnIndex = (static_cast<int32_t>(step.low) &
0xFF800000) >> 23;
// top 8 bits of bottom 32 bits select LUT column
const uint64_t msbStep = step.shiftRightBy32( ); // Number of NCO
overflows
const int stepDiffOffset = msbStep − NCO_overflows_at_ms_start;
const intl 6_t* lut = constantParameters[channelId].tables.pulse;
lut += lutColumnIndex;
for (int i = 0; i < kSmallWindowSize; ++i)
{
  val = channelFilterInput[kLargeWindowSize + stepDiffOffset − i];
  filterVal = lut[i * 512];
  i_result += filterVal * val;
```

The code snippet listed next illustrates code for processing the signal from channel baseband to channel with carrier NCO 266, which contains motion information including Doppler effects, to produce complex mix 256.

```
uint32_t carrier_step = carrierPhaseOffset_after_last_ms[channelId];
carrier_step += tid.x * params.carrierPhaseIncrement[channelId]; // tid =
threadID
float fval = carrier_step * kPi * 2 / kPowerOf2UpTo32; // Scale 32 bit
NCO value to 0...2Pi
ncoOutputRe = cos(fval) * kPowerOf2UpTo32; // Real part of carrier
wave
ncoOutputIm = sin(fval) * kPowerOf2UpTo32; // Imaginary part of carrier
wave
// Complex mix
result.re = ncoOutputRe * filterValue.re − ncoOutputIm * filterValue.im;
result.im = ncoOutputRe * filterValue.im + ncoOutputIm * filterValue.re;
```

Complex mix 256 is a superposition of seven signals 356 to a single IQ complex number stream, summed from the seven outputs from pulse shaping filters 246, to channel baseband. Complex mix 256 takes in carrier NCO 266 with a frequency of 1.5 GHz in one example, and outputs channel complex mix 256 with carrier, an accumulation of channels' IQ stream with carrier for the 64 channels. The disclosed simulator can send the resulting IQ data 259 as an ordered sequence of the digital sample points for the cycle to a converter that is configured to synthesize the RF signal that simulates the channel in the band of the GNSS satellite, from the digital sample points. The resulting data can also be stored in a file for up-conversion. For the example described relative to FIG. 3, 120,000 samples represent the simulated GNSS signal for 64 channels for 1 ms. This output can be processed using a digital to RF generator to produce the simulated GNSS signal.

Figure 4A:
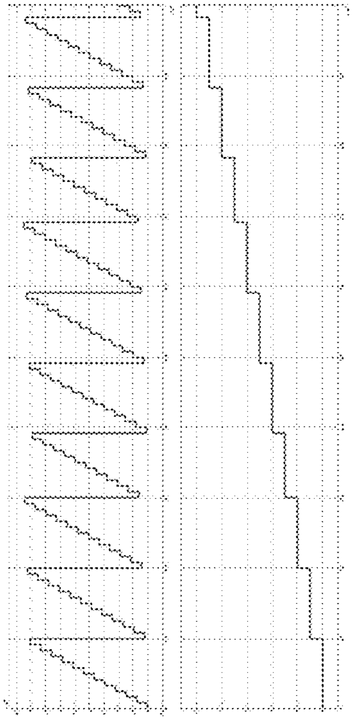
FIG. 4A through FIG. 4F illustrate representative waveforms for steps of the disclosed process for generating GPS simulations.
Figure 4B:
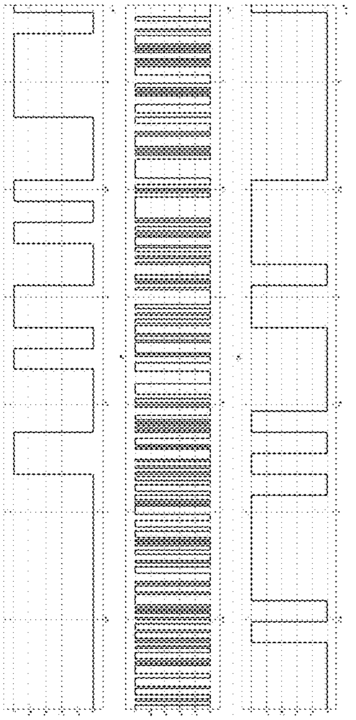
Figure 4C:
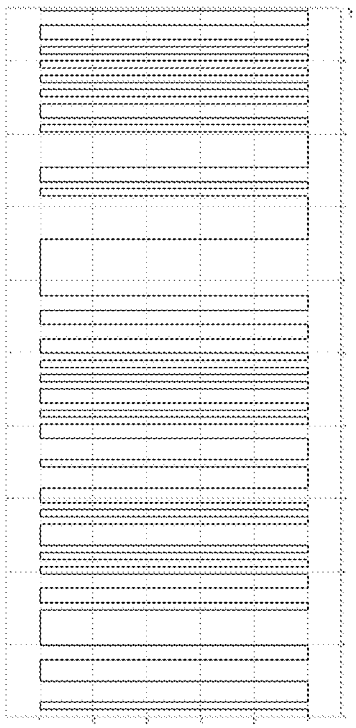
Figure 4D:
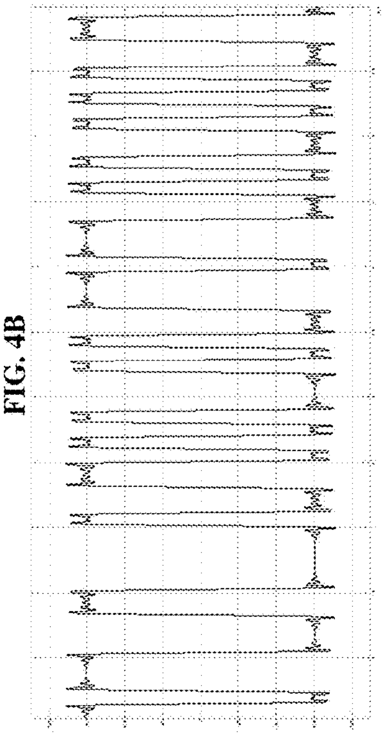
Figure 4E:
Figure 4F:
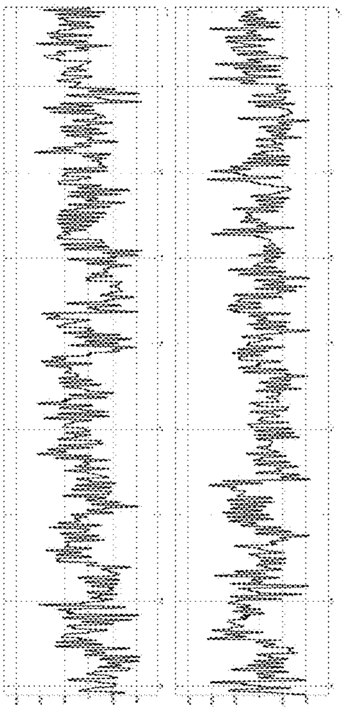

FIG. 4A through FIG. 4F illustrate representative waveforms for steps of the disclosed process for generating GPS simulations. FIG. 4A shows an example code NCO 272 waveform. FIG. 4B shows code generator waveforms. FIG. 4C illustrates an example code selection waveform. FIG. 4D shows a waveform after the signal has passed through the pulse shaping filters. FIG. 4E illustrates the waveform after channel baseband processing. FIG. 4F illustrates the complex mix 256 of code and carrier signals.

Figure 5:
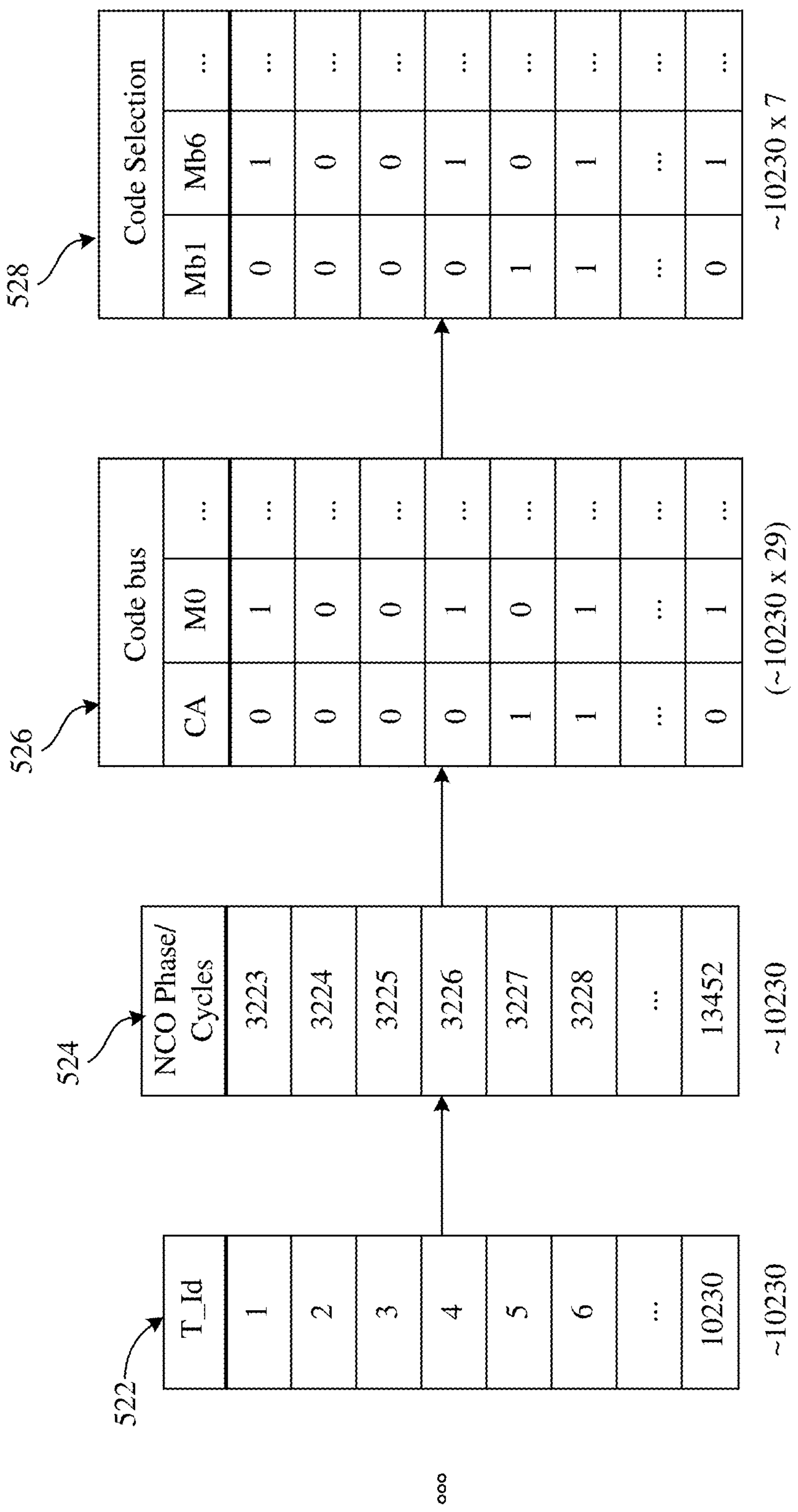
FIG. 5 shows example digital values for NCO state, code generators and filter input (code selection) for various filters, for an example set of thread IDs.

FIG. 5 shows example digital values for NCO state, code generators and filter input (code selection) for various filters, for an example set of thread IDs. Thread IDs 522 are distinct for each of the 10,230 samples that represent a 1 ms batch. NCO phase/cycles 524 map to code bus 526 for each of the 64 channels described earlier. Code selection 528 shows example values for various filters for each of the seven modulators.

Figure 7:
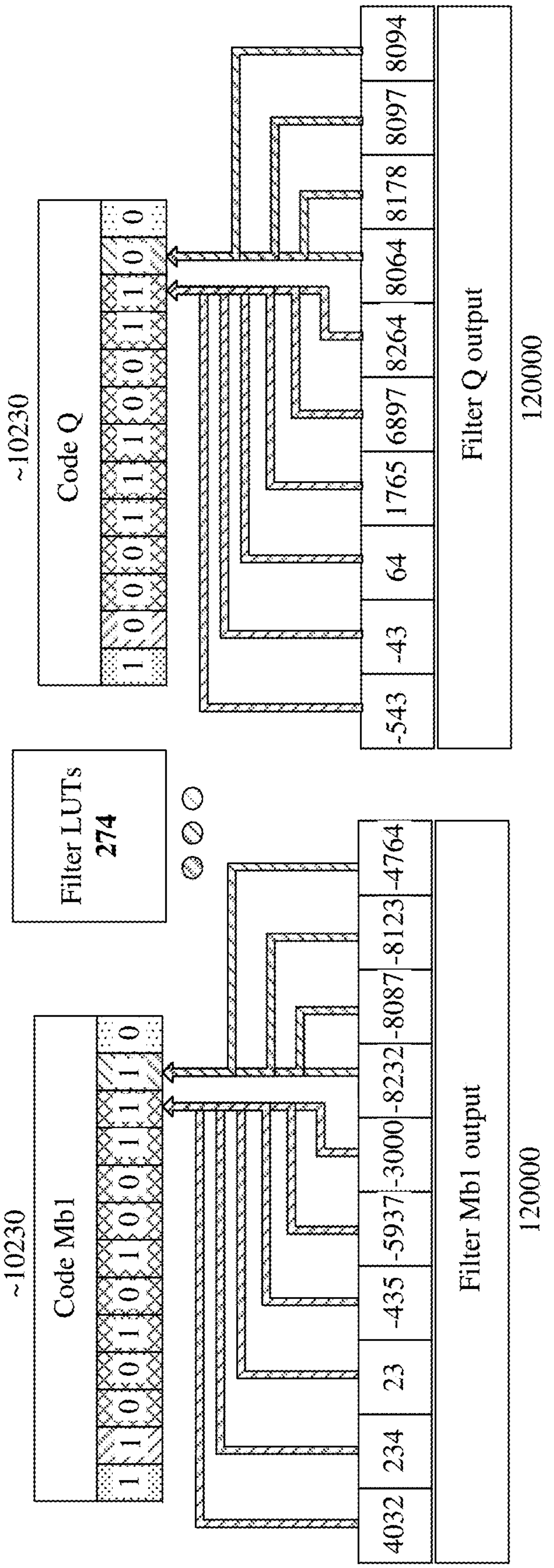
FIG. 7 illustrates a GPU implementation of the pulse shaping filter.

FIG. 7 illustrates the GPU implementation of the pulse shaping filter, a key aspect of the disclosed implementation. The input for each filter is a combined PRN/NAV stream. The rate is max 10.23 Msps as this is currently the fastest PRN code (GPS P code and others). The rate can be increased, or decreased if only slower codes are to be simulated to make the calculation faster/using less resources. The filter output is at 120 Msps and can be adjusted, depending on bandwidth requirements; which is also implemented in the example described, as this has a substantial impact on performance. The filters are implemented as finite impulse response (FIR) filters. That is, each filter output sample is dependent on a certain number (for example a maximum of 20 in our example case) of neighboring input samples. For example, the filter output value 8123 is dependent on the left-slant shaded 1 and the previous nine elements with cross-hatch shading; the output value −435 is dependent on the nine cross-hatch shaded elements and the right-slant shaded 1. Filter coefficients are supplied via 2D-LUT.

Computer System

Figure 6:
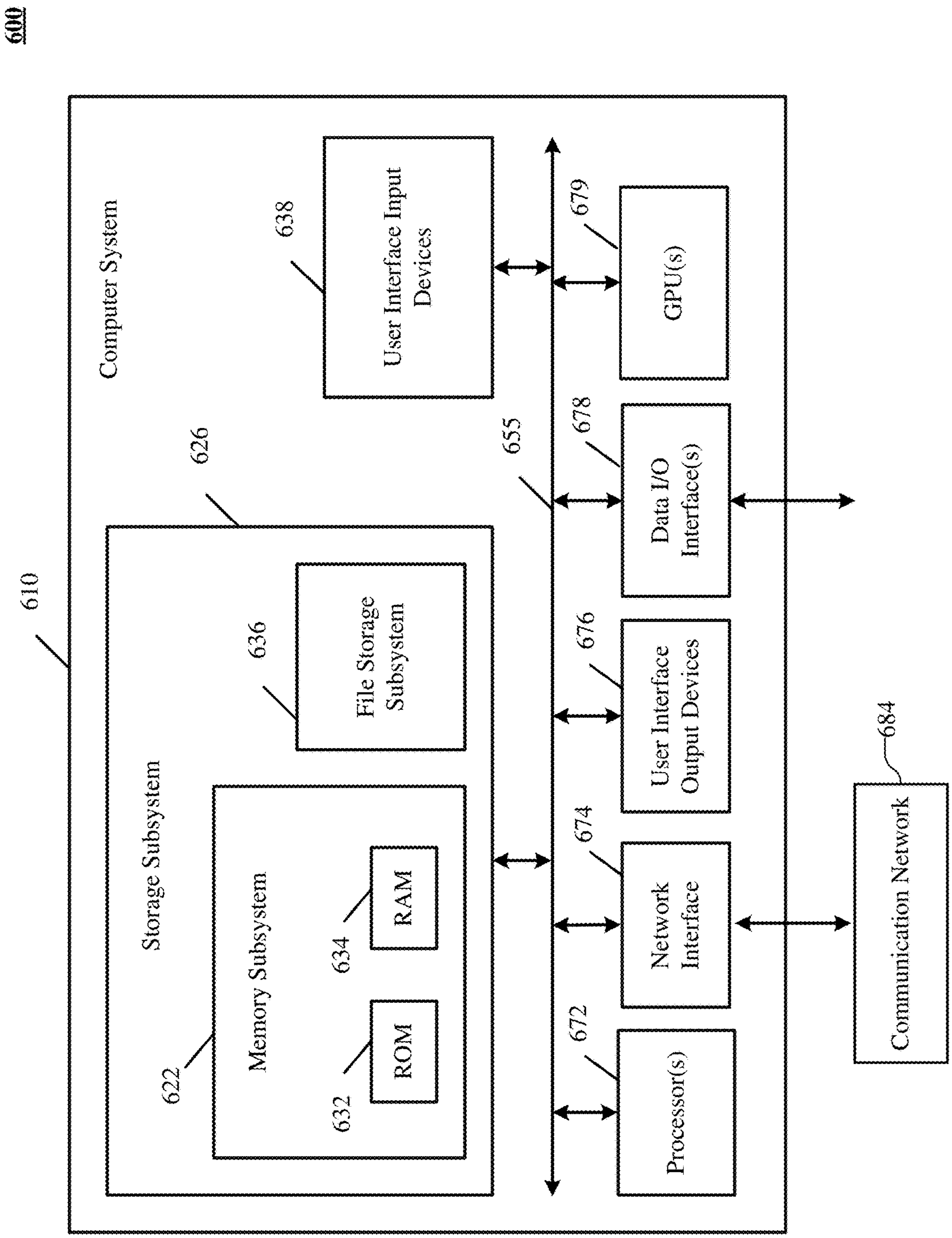
FIG. 6 depicts a block diagram of an exemplary system for preparing digital samples for synthesis of a RF signal encoded to simulate a channel or multiple channels or a GNSS satellite, and multiple GNSS satellites using a GPU, instead of an FPGA, according to one implementation of the technology disclosed.

FIG. 6 is a simplified block diagram of a computer system 600 that can be used for preparing digital samples for synthesis of a RF signal encoded to simulate a channel or multiple channels or a GNSS satellite, and multiple GNSS satellites using a GPU, instead of an FPGA, according to one implementation of the technology disclosed.

Computer system 600 includes multiple GPUs 679 for emulating satellite signals, at least one central processing unit (CPU) 672 that communicates with a number of peripheral devices via bus subsystem 655. These peripheral devices can include a storage subsystem 610 including, for example, memory devices and a file storage subsystem 636, user interface input devices 638, user interface output devices 676, and a network interface subsystem 674. The input and output devices allow user interaction with computer system 600. Network interface subsystem 674 provides an interface to outside networks, including an interface to corresponding interface devices in other computer systems.

In one implementation, external RF receivers can be communicably linked to the storage subsystem 610 and the user interface input devices 638. User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 610 stores programming and data constructs that provide the functionality of some or all of the modules and methods described herein.

Memory subsystem 622 used in the storage subsystem 610 can include a number of memories including a main random access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 610, or in other machines accessible by the processor.

Bus subsystem 655 provides a mechanism for letting the various components and subsystems of computer system 610 communicate with each other as intended. Although bus subsystem 655 is shown schematically as a single bus, alternative implementations of the bus subsystem can use multiple busses.

Computer system 610 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or less components than the computer system depicted in FIG. 6.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

SOME PARTICULAR IMPLEMENTATIONS

Some particular implementations and features are described in the following discussion.

In one implementation, a disclosed method of preparing digital samples for synthesis of a radio frequency, abbreviated RF, signal encoded to simulate a channel of a GNSS satellite using a GPU instead of an FPGA, includes receiving a simulated position and velocity of a receiver antenna, for a simulation cycle, to which a synthesized RF signal is to be provided and dividing the cycle into digital sample points that will be converted into the synthesized RF signal. The method also includes computing the digital sample points for the channel using a multiplicity of cores of a GPU, providing a first LUT, that includes pseudo random sequences that can be combined to produce a channel code that varies over time and is used for encoding the channel and providing a second LUT that specifies linear combinations of the pseudo random sequences in the first LUT that produce channel codes to produce the digital sample points in the cycle. The method further includes using at least one core of the GPU to generate the channel code for a respective sample point by mapping the channel code required to an entry in the second LUT that specifies the pseudo random sequences from the first LUT to combine to produce the channel code, and mapping a time position of the respective sample point to one or more entries in the first LUT that are specified in the second LUT. Also the disclosed method includes combining the channel code for the respective sample point with data to be encoded by the respective sample point, and repeatedly applying the using and the combining to produce the digital sample points in the cycle, using a multiplicity of cores of the GPU to encode respective sample points concurrently in the cycle. The disclosed method also sends an ordered sequence of the digital sample points for the cycle to a converter that is configured to synthesize the RF signal that simulates the channel of the GNSS satellite, from the digital sample points.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations, the first LUT includes between two and one hundred pseudorandom sequences. For other implementations, the first LUT includes between two and twenty-nine pseudorandom sequences. The second LUT specifies linear combinations of two to seven of the pseudo random sequences in the first LUT that produce channel codes. In other implementations, the second LUT specifies linear combinations of two to fifteen of the pseudo random sequences in the first LUT that produce channel codes. The number of filters directly correlates to the number of PRNs. Additional filters can be implemented for additional modulators.

For some implementations of the disclosed method, the data to be encoded by the respective sample point is one of almanac data or position data.

For many implementations of the disclosed method, the multiplicity of cores of the GPU includes a range of 250 to 128,000 cores. The multiplicity of cores enables the processing of many batches in parallel. With further advances in GPU power in the future, more than 128,000 GPU cores may become available for use.

In another implementation, a disclosed method further includes preparing digital samples for synthesis of an RF signal with encoding that simulates multiple channels of a GNSS satellite. The method includes producing multiple channel codes for the multiple channels, combining the channel codes for the respective channels at the sample point with data to be encoded in the respective channels at the sample point to produce the digital sample points for the channels, and combining the data encoded for the multiple channels into a single encoded value for a respective digital sample point before sending the order sequence of the digital sample points for the cycle to the converter. For the disclosed method, at least one complex code channel among the multiple channels can be encoded using a pseudo random sequence generated for the cycle by a pseudo random sequence generator running on one or more of the cores, and using at least the pseudo random sequence generated for the cycle in combination with data to be encoded on the respective sample point to produce the digital sample points in the cycle for the complex code channel.

Some implementations of the disclosed method further include preparing digital samples for synthesis of an RF signal with encoding that simulates multiple GNSS satellites. The method includes producing the digital sample points for the multiple channels of the GNSS satellite, and combining the data encoded for the multiple channels into a single encoded value for a respective digital sample point before sending the order sequence of the digital sample points for the cycle to the converter producing the digital sample points for the multiple GNSS satellites.

One implementation of the disclosed technology further includes preparing digital samples for synthesis of an RF signal with encoding that simulates multiple bands of a GNSS satellite, by extending the method for one band of the GNSS satellite. The disclosed method includes producing the digital sample points for the channels in multiple bands of the GNSS satellite, and combining the data encoded for the multiple bands into a single encoded value for a respective digital sample point before sending the order sequence of the digital sample points for the cycle to the converter.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage media impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of preparing digital samples for synthesis of a radio frequency, abbreviated RF, signal encoded to simulate channels of Global Navigation Satellite System, abbreviated GNSS, satellites using a GPU card, instead of a field programmable gate array, abbreviated FPGA, including:

receiving a simulated position and velocity of a receiver antenna, for a simulation cycle, to which synthesized RF signals are to be broadcast;

dividing the simulation cycle into digital sample points that will be converted into the synthesized RF signals;

computing the digital sample points for the channels using a multiplicity of cores of the GPU card, including:

applying a finite impulse response, abbreviated FIR, filter to generate channel code values for the digital sample points as linear combinations of successive values in a pseudo random sequence listed in a first lookup table, abbreviated LUT, held in memory of the GPU card, with data values for the digital sample points; and combining the channel code values generated for two or more channels to create at least one multi-channel ordered sequence; and sending the ordered sequence to a converter for conversion to a signal encoded to simulate the channels of the satellites in the GNSS.

2. The method of claim 1, wherein using multiple cores of the GPU card in parallel to produce the digital sample points in a batch for the simulation cycle.

3. The method of claim 1, wherein the first LUT includes between two and twenty-nine pseudorandom sequences per channel.

4. The method of claim 1, wherein the first LUT includes between two and one hundred pseudorandom sequences per channel.

5. The method of claim 1, further including a second LUT that specifies the linear combinations of two to seven of the pseudo random sequences in the first LUT.

6. The method of claim 1, further including a second LUT that specifies the linear combinations of two to fifteen of the pseudo random sequences in the first LUT.

7. The method of claim 1, wherein the data to be encoded by the respective sample point is one of almanac data or position data.

8. The method of claim 1, wherein the multiplicity of cores of the GPU card includes a range of 250 to 128,000 cores.

9. The method of claim 1, further including:

producing the digital sample points for respective channels; and combining the data encoded for the respective channels into a single encoded value for a respective digital sample point before sending the ordered sequence to the converter.

10. The method of claim 1, further including:

producing the digital sample points for the respective channels of a particular GNSS satellite, and combining the digital sample points for the respective channels into a single encoded value for a respective digital sample point before sending the ordered sequence to the converter producing for the particular GNSS satellites.

11. A tangible non-transitory computer readable storage media impressed with computer program instructions that, when executed, implement actions of preparing digital samples for synthesis of a radio frequency, abbreviated RF, signal encoded to simulate channels of Global Navigation Satellite System, abbreviated GNSS, satellites using a GPU card, instead of a field programmable gate array, abbreviated FPGA, the actions including:

receiving a simulated position and velocity of a receiver antenna, for a simulation cycle, to which synthesized RF signals are to be broadcast;

dividing the simulation cycle into digital sample points that will be converted into the synthesized RF signals;

computing the digital sample points for the channels using a multiplicity of cores of the GPU card, including:

applying a finite impulse response, abbreviated FIR, filter to generate channel code values for the digital sample points as linear combinations of successive values in a pseudo random sequences listed in a first lookup table, abbreviated LUT, held in memory of the GPU card, with data values for the digital sample points; and combining the channel code values generated for two or more channels to create at least one multi-channel ordered sequence; and sending the ordered sequence to a converter for conversion to a signal encoded to simulate the channels of the satellites in the GNSS.

12. The non-transitory computer readable storage media of claim 11, wherein using multiple cores of the GPU card in parallel to produce the digital sample points in a batch for the simulation cycle.

13. The non-transitory computer readable storage media of claim 11, wherein the first LUT includes between two and twenty-nine pseudorandom sequences per channel.

14. The non-transitory computer readable storage media of claim 11, wherein the first LUT includes between two and one hundred pseudorandom sequences per channel.

15. The non-transitory computer readable storage media of claim 11, further including a second LUT that specifies the linear combinations of two to seven of the pseudo random sequences in the first LUT.

16. The non-transitory computer readable storage media of claim 11, further including a second LUT that specifies the linear combinations of two to fifteen of the pseudo random sequences in the first LUT.

17. The non-transitory computer readable storage media of claim 11, wherein the data to be encoded by the respective sample point is one of almanac data or position data.

18. The non-transitory computer readable storage media of claim 11, wherein the multiplicity of cores of the GPU card includes a range of 250 to 128,000 cores.

19. The non-transitory computer readable storage media of claim 11, further including:

producing the digital sample points for respective channels; and combining the data encoded for the respective channels into a single encoded value for a respective digital sample point before sending the ordered sequence to the converter.

20. The non-transitory computer readable storage media of claim 11, further including:

producing the digital sample points for the respective channels of a particular GNSS satellite, and combining the digital sample points for the respective channels into a single encoded value for a respective digital sample point before sending the ordered sequence to the converter producing for the particular GNSS satellites.

21. A system for preparing digital samples for synthesis of a radio frequency, abbreviated RF, signal encoded to simulate a channel of a Global Navigation Satellite System, abbreviated GNSS, satellite using a GPU card, instead of a field programmable gate array, abbreviated FPGA, includes a multiplicity of GPU processors coupled to memory, the memory loaded with computer instructions, that when executed on the processors, implement actions including:

receiving a simulated position and velocity of a receiver antenna, for a simulation cycle, to which synthesized RF signals are to be broadcast;

dividing the simulation cycle into digital sample points that will be converted into the synthesized RF signals;

computing the digital sample points for the channels using a multiplicity of cores of the GPU card, including:

applying a finite impulse response ("FIR") filter to generate channel code values for the digital sample points as linear combinations of successive values in a pseudo random sequences listed in a first lookup table, abbreviated LUT, held in memory of the GPU card, with data values for the digital sample points; and combining the channel code values generated for two or more channels to create at least one multi-channel ordered sequence; and sending the ordered sequence to a converter for conversion to a signal encoded to simulate the channels of the satellites in the GNSS.

* * * * *